United States Patent [19]

Kelley et al.

[11] 3,840,897

[45] Oct. 8, 1974

[54] MAGNETIC DISC RECORDING ASSEMBLY

[75] Inventors: Jerry O. Kelley, Grass Valley, Calif.; Edward C. Waldspurger, Dayton, Ohio

[73] Assignee: Arvin Industries, Inc., Columbus, Ind.

[22] Filed: Jan. 12, 1972

[21] Appl. No.: 217,173

Related U.S. Application Data

[62] Division of Ser. No. 183,856, Sept. 27, 1971, Pat. No. 3,731,292.

[52] U.S. Cl. .................................................. 360/99

[51] Int. Cl. ............................................. G11b 5/48

[58] Field of Search ............... 340/174.1 E, 174.1 F; 179/100.2 A, 100.2 C, 100.2 P; 346/137

[56] References Cited

UNITED STATES PATENTS

| | | | |
|---|---|---|---|
| 3,110,889 | 11/1963 | Morley et al. | 340/174.1 |
| 3,155,977 | 11/1964 | Marrs | 340/174.1 |
| 3,212,075 | 10/1965 | Damerau et al. | 340/174.1 |
| 3,422,411 | 1/1969 | Smith, Jr. | 340/174.1 |
| 3,696,350 | 10/1972 | Cohen et al. | 340/174.1 E |
| 3,729,720 | 5/1973 | Derling et al. | 340/174.1 E |

*Primary Examiner*—Vincent P. Canney
*Attorney, Agent, or Firm*—Biebel, French & Bugg

[57] ABSTRACT

A magnetic recording system includes a flexible record disc with a magnetizable surface, and a guide finger which engages the underside of the rotating disc and moves a portion of the disc flowing over the finger out of the plane of rotation of the disc. A transducer has its active face mounted close to a channel formed in the guide finger, such that a part of the deflected portion of the flexible disc is captured between the guide finger and the transducer. The flexible disc is part of a sandwich construction including a flexible self-sustaining base attached at its center to the record disc, and a cover extending over the magnetizable surface of the record disc. A hub structure is secured to the record disc and the supporting disc, with the cover having a rotatable connection to the hub structure.

5 Claims, 7 Drawing Figures

MAGNETIC DISC RECORDING ASSEMBLY

CROSS REFERENCE TO RELATED APPLICATIONS

This application is a division of copending application Ser. No. 183,856, filed Sept. 27, 1971, entitled PROCESS AND APPARATUS FOR MAGNETIC DISC RECORDING, now U.S. Pat. No. 3,731,292 and assigned to the same assignee as this application.

BACKGROUND OF THE INVENTION

This invention relates to disc type magnetic recording equipment, which is particularly adaptable for use in large bandwidth systems, which is relatively simple in construction and adaptable to various environments. A number of prior art patents are directed generally to disc recorders using flexible recording discs having at least one magnetizable surface. U.S. Pat. No. 3,155,977 issued Nov. 3, 1964, discloses the use of a self-supporting flexible magnetic recording disc which is mounted on a rotatable spindle, and which cooperates with accessory equipment that shapes the flow of air induced by the spinning disc to control the position of the disc, particularly where portions of the disc pass one or more magnetic transducers. In general, the various devices provided all have a common purpose, namely, to provide an air bearing which maintains the disc at a fixed distance from the transducer during rotation of the disc.

Another approach to the control of a flexible self-sustaining recording disc is disclosed in U.S. Pat. No. 3,060,433 issued Oct. 23, 1962. There the flexible disc is disclosed as rotating within a closed chamber, in which the air naturally flowing toward the periphery of the disc as a result of its rotation at fairly high speed, is controlled through the use of one or more conduits which direct some of this air back and inwardly against a face of the disc, thereby controlling and/or adjusting the contour of the recording disc and its spacing with respect to one or more transducers.

In U.S. Pat. No. 3,226,701, issued Dec. 28, 1965, a similar arrangement is provided wherein air flow resulting from rotation of a flexible recording disc is controlled and redirected against a face of the disc in order to provide an adjustment of the air bearing established between the disc and one or more transducers during disc rotation.

A scheme for evacuating outwardly displaced air from between a turntable and a flexible recording disc, in order to pull the disc into contact with the turntable, is disclosed in U.S. Pat. No. 3,369,227 issued Feb. 13, 1968. In U.S. Pat. No. 3,405,405 issued Oct. 8, 1968, an air jet is employed to depress a rotating flexible magnetic recording disc in the region where the disc passes a transducer, and control of such air flow is employed to adjust the spacing between the disc and the transducer. Another approach, which produces a similar effect, is disclosed in U.S. Pat. No. 3,178,719 issued Apr. 13, 1965, wherein the transducer is mounted within a vacuum conduit, and a vacuum is applied as the flexible recording disc revolves, causing a depression in portions of the disc passing the transducer to achieve a desired spacing between the transducer and the flexible disc.

In all of this prior art, however, a plurality of transducers are employed, and in the case where there is some movement between the transducers and the disc to permit the following of different tracks (as in U.S. Pat. No. 3,405,405) the center of rotation of the disc is shifted. In all of the prior art where a flexible magnetic recording disc is employed, the transducer(s) is permanently mounted, such that the disc cannot readily be replaced or exchanged with similar discs, and likewise the peripheral equipment such as guides, air jets and the like are also arranged in such a way as to make replacement or exchange of the disc difficult. In addition the prior art patents emphasize that a carefully adjusted air bearing is to be maintained between the transducer and the magnetizable surface of the disc, to avoid what are sometimes called crashes and such an air gap reduces the magnetic coupling between the recording and the transducer.

SUMMARY OF THE INVENTION

In the present invention, a thin flexible magnetic recording disc is provided, and rotated from a connection through its center or hub, such that a major portion of the disc from its periphery inwardly is free from direct connection with the support. One or more magnetic transducers are mounted for selective movement along a path generally radially of the disc, so as to follow one or more circular paths, or if desired to follow a helical path, over a magnetizable disc surface. An elongated guide finger is mounted outside the periphery of the disc and extends beneath the opposite or underside of the record disc, opposite the positions which the transducer occupies during operation. The finger is provided with a longitudinal channel which extends the full length of the possible different positions of the transducer. In one embodiment, the finger is movable completely away from the disc, as by swinging or retracting it outwardly of the disc periphery, while the transducer is similarly withdrawn, to enable rapid exchange of record discs.

In actual operation the spacing between the transducer and the magnetizable surface of the record disc is so close that it cannot readily be observed, however it appears that a slight air bearing may exist between the two, but of such minute dimension that a highly effective magnetic coupling is achieved, and the system is capable of recording and playback over a wide bandwidth, from almost D.C. to in excess of 4.5 MHz.

In the preferred embodiment of the invention, the disc assembly comprises a base disc of relatively thin and somewhat flexible plastic, or equivalent, having a thin flexible record disc fastened thereto adjacent its center or hub, for example by having the two parts bonded at their respective center holes to each other and/or to a grooved hub piece. In this case, the record disc can be of such thin material that it is self-supporting. The magnetizable surface on the record disc is away from the support or backing disc, and similarly to the other embodiment, the guide finger is adapted to project between the backing disc and the record disc, with the transducer mounted to have its face extending toward, and preferably into, the guide finger channel. In this embodiment a protective cover disc can also be provided, being of a flexible thin self-sustaining plastic material, having a center hole which is received in the groove of the hub, but not connected thereto. Thus, the hub together with the record disc and backing disc can rotate with respect to the cover disc. A slot or window is formed in the cover disc corresponding generally in dimension to the guide finger channel, and admitting the face of the transducer to the portion of the record disc deflecting over the guide finger.

Thus a thin flexible and self-supporting magnetic recording member is provided which achieves an intimate magnetic coupling relation to a magnetic transducer, thereby achieving an acceptable large bandwidth coverage, and providing a disc recording member which is easily removed, exchanged, stored or replaced when necessary because of its relatively low cost of manufacture. The control of the record disc to transducer interface is achieved precisely, while still permitting the same transducer to be moved to different tracks or channels as may be desired, and also to be removed completely from the region of the disc to allow for quick exchange of the discs as may be desired.

Accordingly, the primary object of the invention is to provide a novel, inexpensive, readily exchanged flexible magnetic recording discs for such recorder mechanism; and to provide such a recording device wherein a thin flexible recording disc supported on a flexible base disc and connected thereto at the centers, has portions deflected over a thin guide finger as the disc is rotated past a transducer which captures portions of the recording disc between the transducer face and the guide finger.

Other objects and advantages of the invention will be apparent from the following description, the accompanying drawing and the accompanying claims.

DESCRIPTION OF THE PREFERRED EMBODIMENTS

Figures 1, 2, 3, 4, 5, 6, 7:
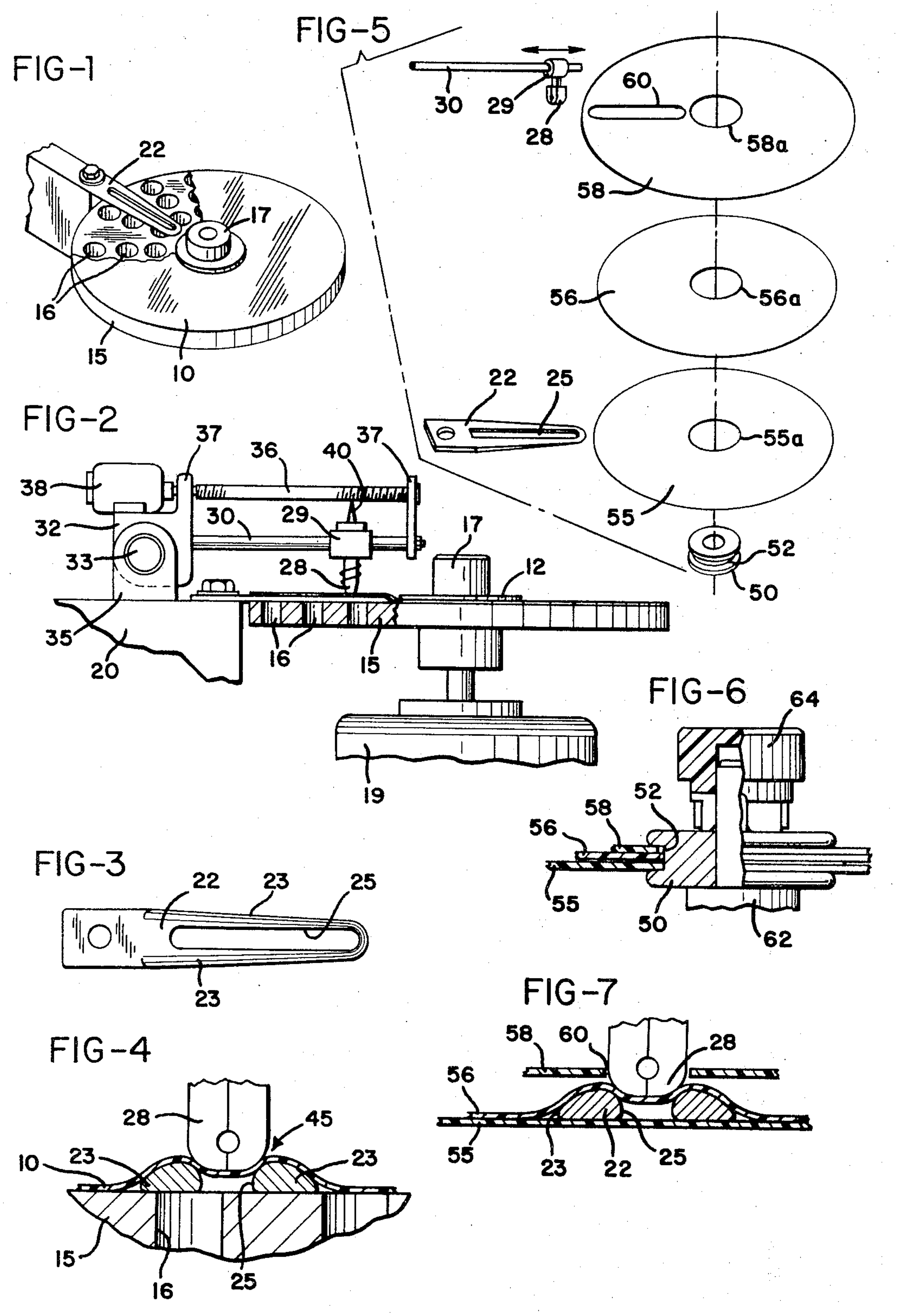
FIG. 1 is a perspective view of a form of recording arrangement disclosed in the parent application, showing a single thin flexible recording disc on a perforated turntable with the cooperating guide finger.
FIG. 2 is a side elevational view of the recording mechanism, showing a segment of the turntable and the record disc in cross section and showing the retractable mounting of the transducer and the guide finger.
FIG. 3 is a detail plan view of the guide finger.
FIG. 4 is a substantially enlarged cross sectional detail showing the interface relationship between the flexible record disc, the guide finger, and the transducer face.
FIG. 5 is an exploded perspective view showing details of the parts of a flexible multiple disc construction comprising the record disc assembly.
FIG. 6 is an enlarged cross sectional view, partly in elevation, showing details of the hub and disc assembly assembly shown in FIG. 5.
FIG. 7 is a detail view showing the relationship between the three-disc embodiment and the guide finger and transducer.

An earlier form of the recording disc and system is illustrated in FIGS. 1–4, wherein the recording disc 10 constitutes a thin flexible sheet of magnetic recording material comprising the usual base with a coating, on at least one surface, of ferromagnetic particles or equivalent. In this embodiment the base material of the disc preferably is constructed of a flexible but self-sustaining base material, fastened at its center or hub section to a somewhat thicker and more rigid hub disc 12. The recording disc is removably held on a turntable 15 having a plurality of transverse apertures or holes 16 throughout a major portion of its surface. The recording disc is held on the turntable by a conventional snap-on retaining hub 17.

The turntable is driven at the desired speed by a motor 19, in close proximity to the deck or support structure 20 which mounts the transducing and guiding elements. These constitute a finger-like member 22 having tapered outer edges 23, as shown particularly in the enlarged cross sectional view in FIG. 4, and an elongated central aperture or channel 25. At least the upper edges of this channel are also rounded slightly, primarily to avoid sharp corners which might cut or abrade the surface of the recording disc. It should be understood that FIG. 4 is magnified and exaggerated beyond actual size for ease of illustration.

The transducer 28 is of an essentially conventional type, and it is mounted for translational movement on a supporting rod 30 which extends from a base or bracket 32 having a pivotal connection 33 to a fixed support 35 on the deck 20. Above the rod 30 there is a lead screw 36 which is rotatably mounted at its opposite ends in supporting arms 37, and which is selectively rotated by a control motor 38, preferably a stepping motor which can locate the lead screw 36 accurately and produce incremental rotation thereof as desired. The transducer carrier 29 includes a follower 40 which engages the lead screw 36, to position the transducer at any one of a number of desired positions transversely of the recording disc and turntable, according to the rotation of the lead screw and its control motor 38.

Preferably the deck or supporting section 20 is mounted in some conventional way for retracting movement toward and away from the turntable 15, although this is not necessary in the embodiment shown in FIGS. 1–4, but may be more desirable with the embodiment shown in FIGS. 5–7 and described hereafter. Also, the entire assembly of the transducer, its supporting rod, and the controlling lead screw, are all pivotable about the pin 33 to withdraw this structure from the region above the turntable. It is thus possible merely by removing the snap-on retainer hub 17, to replace the recording disc 10 quickly and easily.

In operation, as the turntable is rotated, there is an inherent flow of air through the apertures 16, creating a negative pressure in the region between the turntable surface and the disc 10, tending to draw the disc firmly onto the turntable surface. In the region of the guide finger 22, the disc moves up over the guide finger and across the channel 25, and down again onto the turntable surface, as best shown in FIG. 4. The disc 10 is sufficiently flexible that it follows generally the contour shown in FIG. 4 during high speed rotation of the disc, e.g. 1,800 r.p.m.

The transducer 28 is positioned above the channel 25 in the guide finger, and is movable along this channel under control of the lead screw 36 and motor 38. The dimensional arrangement is such that the face of transducer 28 actually causes the portion of the disc passing beneath it and over the channel 25 to assume a somewhat reverse curvature, as shown in FIG. 4, and indicated by the general reference numeral 45, thereby assuring a close head-to-disc relationship which promotes an intimate interface between the transducer of the head and the magnetizable surface of the disc. In operation it is difficult to determine the exact relationship between the transducer face and the recording surface of the disc. Although it would appear to the naked eye that these two parts contact, it also appears from the lack of wear observed on both of these parts, that a very thin film of air may be drawn between them in operation, producing the thin "air bearing" which is not easily perceived, even with substantial optical magnification. It is sufficient to say that the arrangement is such that the portion of the disc passing or flowing over the channel 25 of the guide finger is captured between it and the transducer face, promoting an intimate interface between the transducer and the magnetizable surface of the disc 10, which it has been observed is sufficient to permit recording and reproduction of wide band signals, satisfactory results having been obtained from near D.C. to in excess of 4.5 megacycles.

FIGS. 5–7 illustrate the multiple disc arrangement which is the preferred embodiment of the invention, in which the record disc is provided as a flexible sandwich type arrangement which is essentially self-sustaining, and does not require the use of the turntable as shown in FIGS. 1 and 2. In FIG. 5 the transducer 28, its supporting rod 30, and the guide finger 22 are shown somewhat diagrammatically, it being understood that the arrangement of these parts, their mounting, and their spatial relationship, is essentially the same as shown in FIGS. 1 and 2.

The recording disc assembly in this instance is comprised of a hub 50 having a peripheral slot or groove 52, as shown in FIG. 6, and receiving three disc-like elements. The lowermost disc 55 is a thin but somewhat rigid disc of plastic material, such as Mylar, which is capable of sustaining itself in an essentially flat plane. This disc carries above it a thin recording disc member 56 of material which has a thin and quite flexible base, similar to recording tape, with a magnetizable upper surface. The recording disc in this embodiment can be so thin as to be incapable of sustaining itself statically in an essentially flat plane. The discs 55 and 56 are bonded or joined to each other at their center holes 55*a* and 56*a*, and they are also bonded in this region to the hub 50 within the groove 52.

Above these two discs there is a third or cover disc 58, of about the same flexibility as disc 55, and which preferably is slightly larger in diameter than at least the disc 56, to cover and protect the magnetizable record surface. This upper disc has a center hole 58*a* which is of slightly larger diameter than the diameter of the hub groove 52. Thus, the upper disc 58 is captured within the peripheral groove of the hub 50, but it is free to rotate with respect to the other parts of the assembly. The upper disc has an elongated aperture 60 formed therein to coincide generally with the channel 25 in the guide finger 22.

In operation, the sandwich-like assembly of the three discs and the hub 50 is received on a rotating spindle 62 (FIG. 6) held in place by a suitable device such as the frictional retainer cap 64, and with the guide finger 22 extending between the lower disc 55 and the recording disc 56. The rotation of the assembly produces a centrifugal force which spins out the air between discs 55 and 56 and induces the two discs to rotate essentially in a flat plane. The inherent air movement causes the two rotating discs to cling to each other, and they separate only where the recording disc 56 moves or flows over the guide finger 22 and across its central channel 25, beneath the face of the transducer 28. In that region, the transducer extends through slot 60, and thus the upper disc 58 is held stationary, while the desired close interaction and relationship between the transducer face and the record disc 56 is achieved, as illustrated in FIG. 7. The lower disc 55 functions essentially as a lightweight type of turntable, although it is a part of the recording disc assembly, and is removable therewith, and attached thereto for storage, protection, etc.

The recording disc is maintained essentially in a flat plane by reason of its rotation, but it is sufficiently flexible to flow over the guiding upper surfaces of the guide finger 22, and to flow around the face of the transducer or transducers, thus promoting a close coupling relationship between the recording track or tracks on the record disc and the transducer.

While the form of apparatus herein described constitutes a preferred embodiments of the invention, it is to be understood that the invention is not limited to this precise form of apparatus, and that changes may be made therein without departing from the scope of the invention which is defined in the appended claims.

What is claimed is:

1. A magnetic disc recording assembly comprising
- a flexible recording disc having a magnetizable surface,
- hub means connected to the center of said recording disc,
- a flexible backing disc extending across that surface of said recording opposite from said magnetizable surface,
- and means connecting said backing disc to said recording disc for concurrent rotation and leaving said discs free of direct connection from their periphery inward for a substantial distance.

2. A magnetic disc recording assembly as defined in claim 1,
- including a protective cover extending over said magnetizable surface and rotatably attached to said hub means leaving said recording disc and said backing disc free to rotate with respect to said cover,
- and an aperture in said cover providing access to said magnetizable surface for a transducer.

3. A magnetic record member comprising
- a flexible disc having a magnetizable surface and being of such flexibility and dimension as to be incapable of self-support in a stationary plane, a flexible backing disc extending across the surface opposite the magnetizable surface, and being of slightly different diameter to accommodate insertion of a member between said discs,
- said backing disc being sufficiently rigid to maintain itself and said recording disc essentially flat,
- said discs being connected only in the region of their centers for concurrent rotation,
- and means forming a hub connected to the assembled said discs at their center providing a drive connection for rotation of said recording disc past a magnetic transducer.

4. A magnetic recording member as defined in claim 3, wherein said recording disc is substantially thinner than said backing disc, but is of sufficient mass that it tends to remain in a flat plane when rotated at a substantial speed, and to cling to said backing disc by reason of the movement of air outwardly from between said discs during rotation thereof.

5. A magnetic record member as defined in claim 3, including a thin protective cover disc mounted to said hub over said magnetizable surface, and means providing access to the region beneath said cover for moving a transducer into an active interface with said magnetizable surface.

* * * * *